US009945343B2

(12) United States Patent
Tanaka (10) Patent No.: US 9,945,343 B2
(45) Date of Patent: Apr. 17, 2018

(54) ENGINE CONTROL DEVICE AND ENGINE CONTROL METHOD (71) Applicant: TOYOTA JIDOSHA KABUSHIKI KAISHA, Toyota-shi, Aichi-ken (JP)

(72) Inventor: Hiroya Tanaka, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 118 days.

(21) Appl. No.: 15/110,337

(22) PCT Filed: Jan. 21, 2015

(86) PCT No.: PCT/IB2015/000109
§ 371 (c)(1),
(2) Date: Jul. 7, 2016

(87) PCT Pub. No.: WO2015/110908
PCT Pub. Date: Jul. 30, 2015

(65) Prior Publication Data
US 2016/0327009 A1 Nov. 10, 2016

(30) Foreign Application Priority Data
Jan. 22, 2014 (JP) .................. 2014-009822

(51) Int. Cl.
F02D 41/00 (2006.01)
F02P 5/04 (2006.01)
(Continued)

(52) U.S. Cl.
CPC .............. *F02P 5/045* (2013.01); *F02D 37/02* (2013.01); *F02D 41/0077* (2013.01);
(Continued)

(58) Field of Classification Search
CPC .......... F02P 5/045; F02P 5/145; F02P 5/1516; F02M 26/53; F02M 26/49; F02D 41/0077; F02D 41/126; F02D 37/02; Y02T 10/46
See application file for complete search history.

(56) References Cited

U.S. PATENT DOCUMENTS 5,509,389 A * 4/1996 Oshima .................. F02D 37/02
123/406.5
5,988,137 A * 11/1999 Tamura ............... F02D 41/0002
123/295
(Continued)

FOREIGN PATENT DOCUMENTS

JP 2007-278224 A 10/2007
JP 2008-019729 A 1/2008
(Continued)

*Primary Examiner* — Hieu T Vo
*Assistant Examiner* — Sherman Manley
(74) *Attorney, Agent, or Firm* — Oliff PLC (57) ABSTRACT

A control device for an engine including an EGR system, the control device includes an electronic control unit. The electronic control unit is configured to forcedly open and close an EGR valve and make a malfunction diagnosis of the EGR system, during fuel cutoff, perform ignition timing retard control when the engine returns from the fuel cutoff, and set the ignition timing at a start point of the ignition timing retard control to a more advanced value when an elapsed period from the malfunction diagnosis of the EGR system to a return from the fuel cutoff is short, as compared with the case where the elapsed period is long, so as to reduce a retard amount of the ignition timing at the start point of the ignition timing retard control, relative to the ignition timing immediately before the start of the ignition timing retard control.

5 Claims, 6 Drawing Sheets

(51) Int. Cl.
  *F02D 41/12*   (2006.01)
  *F02P 5/15*    (2006.01)
  *F02D 37/02*   (2006.01)
  *F02M 26/49*   (2016.01)
  *F02M 26/53*   (2016.01)
  *F02P 5/145*   (2006.01)
  *F02D 41/30*   (2006.01)

(52) U.S. Cl.
  CPC ........... *F02D 41/126* (2013.01); *F02M 26/49* (2016.02); *F02M 26/53* (2016.02); *F02P 5/145* (2013.01); *F02P 5/1516* (2013.01); *F02D 41/307* (2013.01); *Y02T 10/46* (2013.01)

(56) References Cited

U.S. PATENT DOCUMENTS

| | | | | |
|---|---|---|---|---|
| 6,089,206 | A * | 7/2000 | Suzuki | F02D 41/307 123/295 |
| 7,066,160 | B2 * | 6/2006 | Matsumoto | F02D 13/0238 123/568.16 |
| 7,571,047 | B2 * | 8/2009 | Pfeiffer | G01M 15/102 123/90.15 |
| 8,631,691 | B2 * | 1/2014 | Tanaka | F02D 41/0077 73/114.74 |
| 9,027,535 | B2 * | 5/2015 | Inoue | F02M 26/05 123/568.11 |
| 9,157,390 | B2 * | 10/2015 | Song | F02D 41/0072 |
| 2001/0013329 | A1 * | 8/2001 | Matsumoto | F02D 37/02 123/295 |
| 2001/0035172 | A1 * | 11/2001 | Osaki | F02D 21/08 123/568.16 |
| 2007/0062499 | A1 * | 3/2007 | Miyasako | F02B 77/082 123/568.16 |
| 2011/0011378 | A1 * | 1/2011 | Nakamura | F02D 41/1495 123/568.16 |
| 2011/0023829 | A1 * | 2/2011 | Miyashita | F02D 41/0087 123/445 |
| 2013/0085653 | A1 * | 4/2013 | Furuta | F02M 25/0702 701/102 |
| 2014/0020664 | A1 * | 1/2014 | Yoshioka | F02B 33/00 123/559.1 |
| 2014/0229088 | A1 | 8/2014 | Matsumoto et al. | |
| 2014/0298777 | A1 * | 10/2014 | Koga | F02D 41/1462 60/274 |

FOREIGN PATENT DOCUMENTS

| | | |
|---|---|---|
| JP | 2009-191791 A | 8/2009 |
| JP | 2009-257280 A | 11/2009 |
| JP | 2010-096003 A | 4/2010 |
| JP | 2010-249053 A | 11/2010 |
| JP | 2012-159003 A | 8/2012 |
| WO | 2009130563 A1 | 10/2009 |
| WO | 2013/030971 A1 | 3/2013 |

\* cited by examiner

ENGINE CONTROL DEVICE AND ENGINE CONTROL METHOD

BACKGROUND OF THE INVENTION

1. Field of the Invention

The invention relates to an engine control device that makes a malfunction diagnosis of an exhaust gas recirculation system during fuel cutoff, and also relates to an engine control method.

2. Description of Related Art

An exhaust gas recirculation (EGR) system that recirculates a part of exhaust gas into intake air is known as a system installed on a vehicle, or the like. The EGR system has an EGR passage that connects an exhaust passage and an intake passage of the engine, and an EGR valve mounted in the EGR passage. The EGR system is configured to increase and reduce the EGR amount, i.e., the amount of gas recirculated from the exhaust passage into the intake passage, through control of the degree of opening of the EGR valve.

In a system as described in Japanese Patent Application Publication No. 2009-257280 (JP 2009-257280 A), a malfunction diagnosis of the EGR system as described above is conducted during fuel cutoff. The malfunction diagnosis is performed by forcedly opening and closing the EGR valve during fuel cutoff, and determining whether the EGR system is functioning normally, depending on whether a change commensurate with an increase or reduction of the EGR amount due to the opening or closing of the EGR valve appears in a detection value of an air flow meter or an intake pressure sensor installed in the intake passage.

In this connection, even if the fuel cutoff is started, combustion gas in the interior of the exhaust passage is not immediately replaced by new air, but remains for a while. If the malfunction diagnosis of the EGR system is conducted in this condition, the combustion gas remaining in the exhaust gas is introduced into the intake air, in accordance with opening and closing of the EGR valve. If the engine returns from the fuel cutoff state at this time, combustion is resumed in a condition where air containing combustion gas is introduced in the cylinder, which may result in unstable combustion.

When the engine returns from the fuel cutoff state, combustion is suddenly resumed and engine torque is generated, from a condition where combustion has not been done, and the engine torque is equal to zero. Therefore, a step-like change appears in torque at the time of return from fuel cutoff, and the driver recognizes the step-like change as torque shock. As a measure to avoid or alleviate the torque shock, control for retarding the ignition timing at the time of the initial explosion after the return, namely, ignition timing retard control at the time of return from fuel cutoff, is performed. In the following, the retard amount of the ignition timing at the initial explosion after the return is denoted as "initial retard amount".

Figure 7:
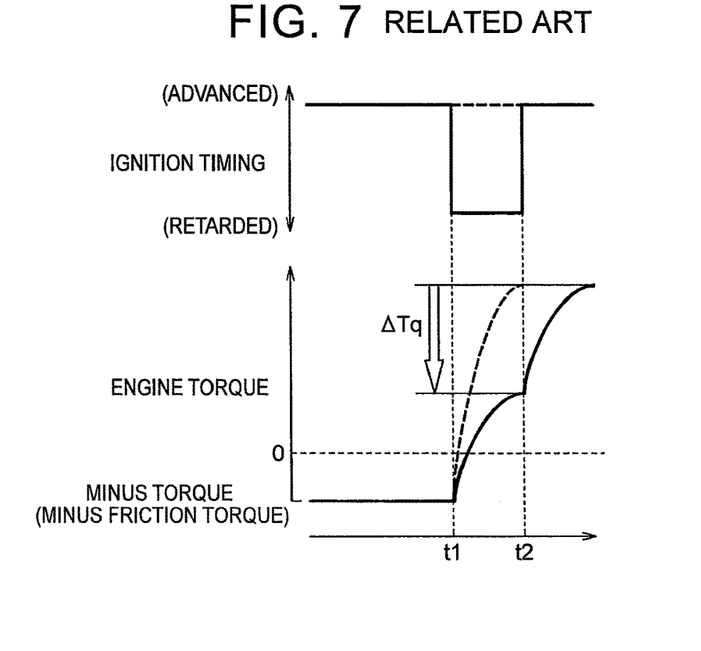
FIG. 7 is a time chart showing one example of control mode of return-time ignition timing retard control according to the related art.

FIG. 7 shows one example of control mode of the ignition timing retard control as described above. In a time chart of FIG. 7, time t1 denotes the time of the initial explosion after return from fuel cutoff, and time t2 indicates the time of the second explosion after the return. If the ignition timing is not retarded at the initial explosion after the return, as indicated by a broken line in FIG. 7, the engine torque rapidly rises after the initial explosion, and torque shock occurs. On the other hand, if the ignition timing is retarded at the initial explosion after the return, as indicated by a solid line in FIG. 7, the rise of the engine torque after the initial explosion is reduced by an amount of "$\Delta Tq$", and the step-like change in torque at the time of return from fuel cutoff is reduced.

On the other hand, when the engine returns from the fuel cutoff state immediately after the malfunction diagnosis of the EGR system as described above, combustion is resumed in a condition where the amount of new air flowing into the cylinder is larger than usual. In this case, even if the ignition timing retard control is performed as usual at the time of return from fuel cutoff, torque shock may not be sufficiently alleviated.

Figure 8:
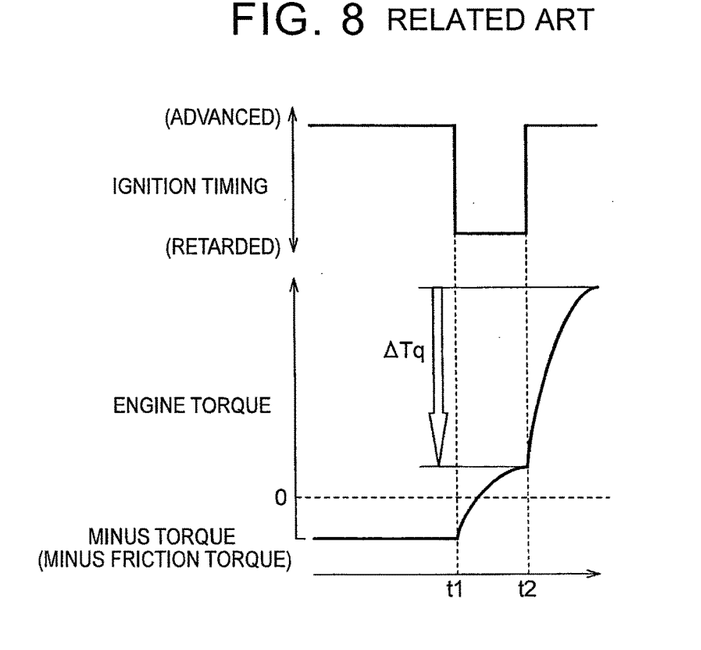
FIG. 8 is a time chart showing one example of control mode of return-time ignition timing retard control when the engine returns from a fuel cutoff state immediately after a malfunction diagnosis, according to the related art.

FIG. 8 shows one example of control mode of return-time ignition timing retard control performed when the engine returns from a fuel cutoff state immediately after a malfunction diagnosis. In the engine returning from the fuel cutoff state at this time, the combustion state is improved with an increase in the amount of new air flowing into the cylinder. As a result, the sensitivity of engine torque to the ignition timing is enhanced. Namely, if the ignition timing at the initial explosion after the return is retarded by the same amount as usual, the amount of reduction $\Delta Tq$ of engine torque becomes larger than usual. In this case, since the rise of the engine torque at the initial explosion after the return is suppressed by a larger degree, the engine torque rises rapidly after the ignition timing stops being retarded (in the example of FIG. 8, after the second explosion after the return), and the driver may recognize the rapid rise as torque shock.

SUMMARY OF THE INVENTION

The invention provides an engine control device that can favorably suppress torque shock when the engine returns from a fuel cutoff state.

A first aspect of the invention is concerned with a control device of an engine including an exhaust gas recirculation system. The exhaust gas recirculation system includes an exhaust gas recirculation valve that adjusts an amount of exhaust gas recirculated. The control device includes an electronic control unit. The electronic control unit is configured to forcedly open and close the exhaust gas recirculation valve and make a malfunction diagnosis of the exhaust gas recirculation system, during fuel cutoff of the engine. The electronic control unit is configured to perform an ignition timing retard control that retards an ignition timing of the engine when the engine returns from the fuel cutoff. The electronic control unit is configured to set the ignition timing at a start point of the ignition timing retard control to a more advanced value when an elapsed period from the malfunction diagnosis of the exhaust gas recirculation system to a return from the fuel cutoff is equal to or less than a criterial value, as compared with the case where the elapsed period is longer than the criterial value, so as to reduce a retard amount of the ignition timing at the start point of the ignition timing retard control, relative to the ignition timing immediately before the start of the ignition timing retard control.

When the engine returns from a fuel cutoff state immediately after a malfunction diagnosis of the exhaust gas recirculation system is conducted through forced opening and closing of the exhaust gas recirculation valve, the amount of new air flowing into the cylinder at the start of the return is larger than that in the case where no malfunction diagnosis of the exhaust gas recirculation system is conducted during fuel cutoff, and its combustion state is improved. Namely, combustion is less likely or unlikely to be unstable due to resumption of combustion in a condition where air containing combustion gas is introduced into the cylinder. Therefore, the sensitivity of engine torque to the ignition timing becomes higher than usual. Thus, if the ignition timing at the start point of the ignition timing retard control is retarded in the same manner as usual when the engine returns from the fuel cutoff state, the engine torque is suppressed by a larger degree than usual, and the engine torque rapidly or sharply rises when the retarded ignition timing is returned to the base ignition timing.

In this respect, in the control device as described above, when the elapsed period from the malfunction diagnosis to the return from fuel cutoff is equal to or less than the criterial value, the ignition timing at the start of the retard control is set to a more advanced value, and the retard amount of the ignition timing under the retard control is reduced, as compared with the case where the elapsed period is longer than the criterial value. Therefore, even when the engine returns from the fuel cutoff state in a condition where the amount of air flowing into the cylinder is larger than usual, the rise of the engine torque is moderately suppressed.

At a certain point in time during rising of the engine torque after return from fuel cutoff, a torque transmission condition of a vehicle power train changes from a negative torque condition in which torque is transmitted from the drive wheels to the engine, to a positive torque condition in which torque is transmitted from the engine to the drive wheels. Since the torsional moment is applied to the vehicle power train in opposite directions, between the negative torque condition and the positive torque condition, torsional strain accumulated in the vehicle power train under the negative torque condition is released upon transition from the negative torque condition to the positive torque condition. As a result, vibrations, called "jerking", of the vehicle body in the vehicle longitudinal direction may be generated.

The acceleration applied in the vehicle longitudinal direction at this time once increases largely due to the above-described release of torsional strain, and then decreases due to its swing-over. At this time, if the engine torque has been sufficiently raised or increased, the swing-over may be alleviated. Accordingly, it is desirable to adjust the period of the ignition timing retard control at the time of return from fuel cutoff, so that the engine torque is sufficiently raised when the swing-over after release of torsional strain occurs.

On the other hand, when the engine returns from the fuel cutoff state immediately after a malfunction diagnosis of the exhaust gas recirculation system as described above, the timing of transition from the negative torque condition to the positive torque condition is advanced, for improvement of the combustion state. Therefore, if the ignition timing retard control at the time of return from fuel cutoff is performed as usual, swing-over of release of torsional strain occurs, in a condition where the engine torque has not been sufficiently raised, and the above-mentioned jerking may not be sufficiently curbed.

In the control device as described above, the electronic control unit may be configured to maintain the ignition timing at the start point of the ignition timing retard control for a predetermined period, after the start of the ignition timing retard control, and reduce the predetermined period when the elapsed period from the malfunction diagnosis of the exhaust gas recirculation system to the return from the fuel cutoff is equal to or less than the criterial value, to be shorter than the predetermined period in the case where the elapsed period is longer than the criterial value. With this arrangement, the engine torque rises early after the engine returns from the fuel cutoff state. Therefore, even if the timing of release of torsional strain is advanced, the engine torque can be raised or increased before the swing-over occurs, and the vibrations of the vehicle body can be favorably suppressed.

In the control device as described above, the electronic control unit may be configured to maintain the ignition timing at the start point of the ignition timing retard control for a predetermined period, after the start of the ignition timing retard control, and then advance the ignition timing until the ignition timing is returned to a base ignition timing, such that a rate at which the ignition timing is advanced is higher when the elapsed period from the malfunction diagnosis of the exhaust gas recirculation system to the return from the fuel cutoff is equal to or less than the criterial value, than the ignition timing in the case where the elapsed period is longer than the criterial value. In this case too, the engine torque is raised from an earlier point in time, and the vehicle body vibrations can be favorably suppressed.

In order to recover the exhaust cleanup capability of a catalyst, which has deteriorated during fuel cutoff, the air-fuel ratio may be temporarily shifted to the rich side when the engine returns from the fuel cutoff state. In this case, if the air-fuel ratio is switched to a leaner value after being temporarily shifted to the rich side, the engine torque may be reduced, and a step-like change may occur in torque. In the control device as described above, the electronic control unit may be configured to perform air-fuel ratio control so as to switch an air-fuel ratio of an air-fuel mixture burned in the engine, to a leaner value, at a point in time at which a predetermined period elapses from the start of the ignition timing retard control. The electronic control unit may be configured to maintain the ignition timing at the start point of the ignition timing retard control, from the start of the ignition timing retard control to switching of the air-fuel ratio, then advance the ignition timing by a given amount at a time, and then gradually advance the ignition timing until the ignition timing is returned to a base ignition timing. With this arrangement, the step-like change in torque at the time of switching of the air-fuel ratio can be favorably curbed.

A second aspect of the invention is concerned with a method of controlling an engine including an exhaust gas recirculation system. The exhaust gas recirculation system includes an exhaust gas recirculation valve that adjusts an amount of exhaust gas recirculated. The method includes forcedly opening and closing the exhaust gas recirculation valve and making a malfunction diagnosis of the exhaust gas recirculation system, during fuel cutoff of the engine, performing an ignition timing retard control that retards an ignition timing of the engine when the engine returns from the fuel cutoff, and setting the ignition timing at a start point of the ignition timing retard control to a more advanced value when an elapsed period from the malfunction diagnosis of the exhaust gas recirculation system to a return from the fuel cutoff is equal to or less than a criterial value, as compared with the case where the elapsed period is longer than the criterial value, so as to reduce a retard amount of the ignition timing at the start point of the ignition timing retard control, relative to the ignition timing immediately before the start of the ignition timing retard control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
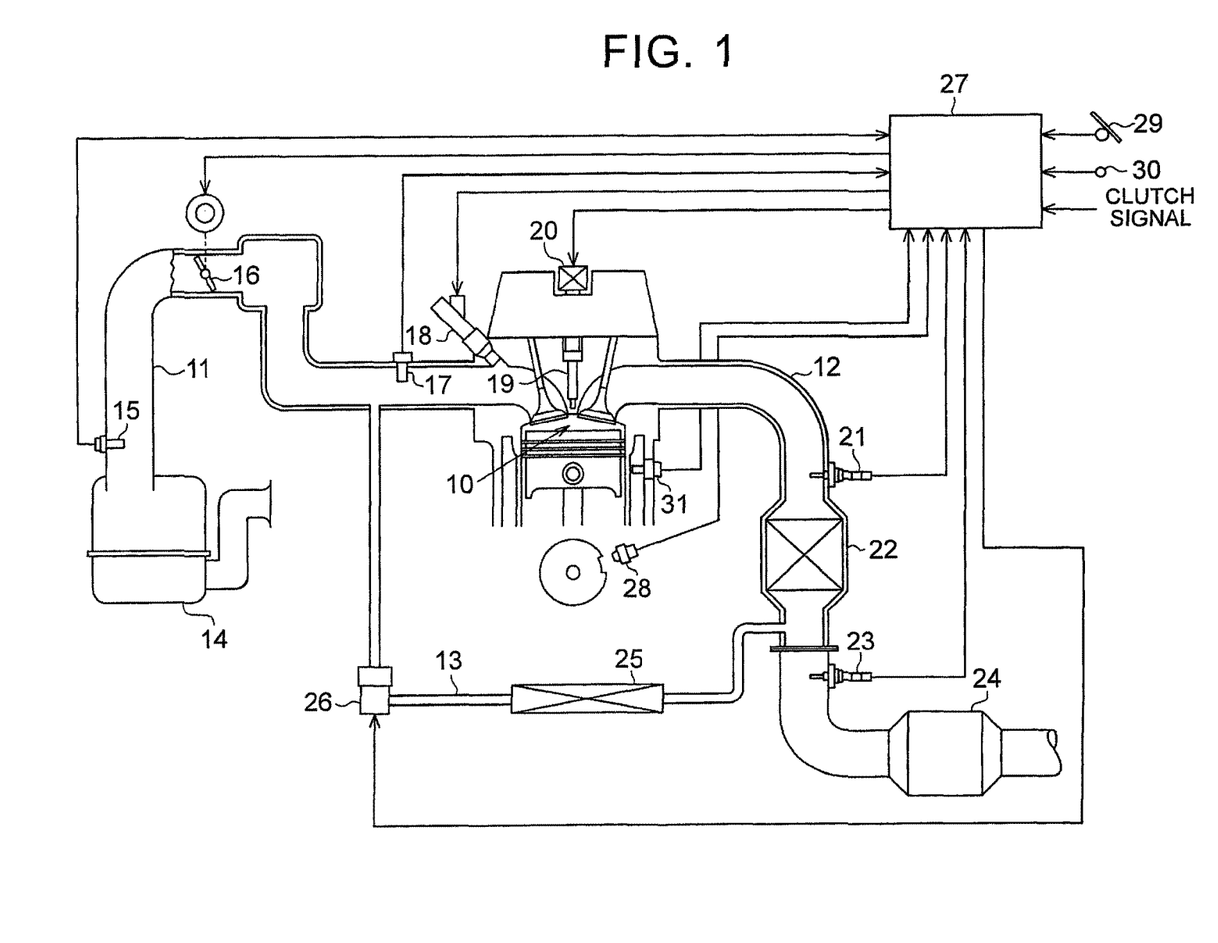
FIG. 1 is a schematic view of an engine in which an engine control device as one embodiment of the invention is employed.

Referring to FIG. 1 through FIG. 6, an engine control device as one embodiment of the invention will be described in detail. In FIG. 1, the configuration of an engine in which the control device of this embodiment is employed is illustrated. As shown in FIG. 1, the engine has an intake passage 11 through which intake air to be fed to a combustion chamber 10 flows, and an exhaust passage 12 through which exhaust gas discharged from the combustion chamber 10 flows.

In the intake passage 11, an air cleaner 14, air flow meter 15, throttle valve 16, intake pressure sensor 17, and an injector 18 are installed in this order as seen from the upstream side of the passage 11. The air cleaner 14 filters out dust, etc. in the atmosphere drawn into the intake passage 11, so as to clean the intake air. The air flow meter 15 detects the amount (intake air amount GA) of new air thus drawn into the intake passage 11. The throttle valve 16 adjusts the intake air amount GA by changing the degree of opening thereof so as to increase or reduce the flow passage area of the intake air. The intake pressure sensor 17 detects the pressure (intake pressure PM) of the intake air in a portion of the intake passage 11 downstream of the throttle valve 16. The injector 18 injects fuel into the intake air, so as to form an air-fuel mixture to be burned in the combustion chamber 10.

An ignition plug 19 that ignites the air-fuel mixture introduced into the combustion chamber 10 with an electric spark is installed in the combustion chamber 10. An igniter 20 is installed on top of the ignition plug 19. The igniter 20 generates a high voltage required to form the electric spark.

In the exhaust passage 12, an air-fuel ratio sensor 21, upstream catalyst device 22, oxygen sensor 23, and a downstream catalyst device 24 are installed in this order as seen from the upstream side of the passage 12. The air-fuel ratio sensor 21 detects the oxygen concentration in exhaust gas discharged from the combustion chamber 10, or the air-fuel ratio of the air-fuel mixture burned in the combustion chamber 10. The upstream and downstream catalyst devices 22, 24 clean up harmful components in the exhaust gas. The oxygen sensor 23 outputs a signal indicative of the oxygen concentration in the exhaust gas that has passed through the upstream catalyst device 22.

In this engine, an exhaust gas recirculation system (which will be referred to as "EGR system") for recirculating a part of exhaust gas flowing in the exhaust passage 12, into the intake air flowing in the intake passage 11, is provided. The EGR system has an EGR passage 13 that connects the exhaust passage 12 with the intake passage 11. The EGR passage 13 is arranged to connect a portion of the exhaust passage 12 downstream of the catalyst device 22, with a portion of the intake passage 11 downstream of the throttle valve 16. An EGR cooler 25 for cooling gas recirculated from the exhaust passage 12 into the intake passage 11, and an EGR valve (exhaust gas recirculation valve) 26 that is opened and closed so as to adjust the amount of gas recirculated, or the EGR amount, are installed in the EGR passage 13.

The engine as described above is controlled by an electronic control unit 27 as the engine control device. The electronic control unit 27 receives detection signals of various sensors for detecting operating conditions of the engine and the vehicle. The detection signals include, for example, those of the above-described air flow meter 15, intake pressure sensor 17, air-fuel ratio sensor 21, and the oxygen sensor 23. In addition, the electronic control unit 27 receives detection signals of a crank angle sensor 28 for detecting the angle of rotation of the crankshaft as an output shaft of the engine, an accelerator pedal position sensor 29 for detecting the amount of depression of the accelerator pedal (accelerator operation amount ACCP), a vehicle speed sensor 30 for detecting the vehicle speed SPD, and a water temperature sensor 31 for detecting the coolant temperature THW of the engine. Further, the electronic control unit 27 receives a clutch signal indicating connection/disconnection of a power transmission path of a vehicle power train. Then, the electronic control unit 27 controls operating conditions of the engine, by driving various actuators provided in respective parts of the engine, including the above-described throttle valve 16, injector 18, igniter 20, and the EGR valve 26, based on the above-indicated signals.

The electronic control unit 27 performs fuel cutoff control, as a part of engine control, by cutting off fuel supply to the engine during deceleration of the vehicle. The fuel cutoff is carried out when the vehicle speed SPD is equal to or higher than a given speed, and the accelerator operation amount ACCP is equal to "0". On the other hand, if any of the following conditions that the vehicle speed SPD is reduced to be equal to or lower than a given value (return vehicle speed $\alpha$), the engine speed NE is reduced to be equal to or lower than a give value (return engine speed ($\beta$)), and that the accelerator pedal is depressed (ACCP>0), is satisfied during fuel cutoff, the fuel supply is resumed, and the engine returns from the fuel cutoff state.

Since new air flows in the exhaust passage 12 during fuel cutoff, and a catalyst atmosphere of the catalyst device 22 has a high oxygen concentration, a large amount of oxygen is stored in the catalyst. Therefore, when the engine returns from the fuel cutoff state, the catalyst has a reduced oxygen storage ability. Thus, the electronic control unit 27 performs air-fuel ratio control to temporarily reduce the air-fuel ratio of the air-fuel mixture burned in the combustion chamber 10 of the engine (i.e., make the mixture fuel-rich) when returning from the fuel cutoff mode, so as to release oxygen stored in the catalyst, and recover its oxygen storage ability.

During fuel cutoff, the electronic control unit 27 performs a malfunction diagnosis of the EGR system. The malfunction diagnosis of the EGR system is carried out when all of the following conditions that warm-up of the engine is completed, the engine is operated in the fuel cutoff mode, the vehicle speed SPD is equal to or higher than a given value, the engine speed NE is within a predetermined range, and that the malfunction diagnosis has not been completed in the current trip, are satisfied.

Once the malfunction diagnosis is started, the electronic control unit 27 opens the EGR valve 26 to a predetermined degree of opening, keeps the valve 26 opened for a given period of time, and then closes the EGR valve 26. Then, the electronic control unit 27 determines the presence or absence of a malfunction in the EGR system, based on the amount of change of the intake pressure PM during the above operation. Namely, if the amount of change of the intake pressure PM at the time of opening or closing of the EGR valve 26 deviates from an amount commensurate with increase or decrease of the EGR amount caused by the opening or closing of the EGR valve 26, the electronic control unit 27 determines that a malfunction, such as poor operation of the EGR valve 26 or clogging of the EGR passage 13, occurs in the EGR system. If the engine load factor KL changes by a given value or larger, during execution of the malfunction diagnosis, the electronic control unit 27 interrupts the diagnosis in the fuel cutoff state, and conducts a diagnosis again in the next or subsequent fuel cutoff event. The engine load factor KL is the ratio of the amount of new air currently drawn into the cylinder, to the amount of new air drawn into the cylinder when the throttle valve 16 is fully opened at the current engine speed, which is regarded as a reference value "1".

Furthermore, the electronic control unit 27 performs return-time ignition timing retard control, i.e., control for retarding the ignition timing so as to suppress torque shock associated with resumption of combustion. The return-time ignition timing retard control is performed for the purposes of reducing a step-like change in engine torque caused by resumption of combustion, and alleviating shock due to release of torsional strain of the vehicle power train when transmission torque of the vehicle power train turns positive from negative. In the following, the return-time ignition timing retard control will be described in detail.

To calculate a final ignition timing AOP as a control command value of the ignition timing, the electronic control unit 27 calculates a base ignition timing ABSE according to operating conditions of the engine, such as the engine speed and the engine load factor, and also calculates a return-time ignition timing AFC in the manner as will be described later. Then, the electronic control unit 27 sets a value of the more retarded one of the base ignition timing ABSE and the return-time ignition timing AFC as the final ignition timing AOP.

The return-time ignition timing AFC is set to the initial value obtained according to an expression as indicated below when the operation to return from fuel cutoff is started, and its value is then changed through an updating process depending on the number of times of ignition after return from fuel cutoff. In this embodiment, the initial value corresponds to the ignition timing at the start of the retard control. As indicated in the following expression, the initial value of the return-time ignition timing AFC is obtained by subtracting three retard amounts, i.e., the water-temperature ignition retard amount AFCTHW, speed-ratio ignition retard amount AFCRATIO, and the return-time ignition retard amount AFCEGRD, from a misfire limit ignition timing AMFG as a limit value of the advanced ignition timing which can prevent the engine from misfiring.

AFC[BTDC]←AMFG[BTDC]-AFCTHW[CA]-AFCRATIO[CA]-AFCEGRD[CA] In this expression, the return-time ignition retard amount AFCEGRD is the base value of the ignition timing retard amount for reducing engine torque, by an amount required to suppress torque shock. On the other hand, the water-temperature ignition retard amount AFCTHW is a retard amount for compensating for an amount of change in the combustion state depending on a temperature condition of the engine, and its value is set according to the coolant temperature of the engine. The speed-ratio ignition retard amount AFCRATIO is a retard amount for compensating for an amount of change in the magnitude of counter torque (torque transmitted from the drive wheels to the engine) of the vehicle power train depending on the speed ratio of the transmission, and its value is set according to the speed ratio of the transmission.

Figure 2:
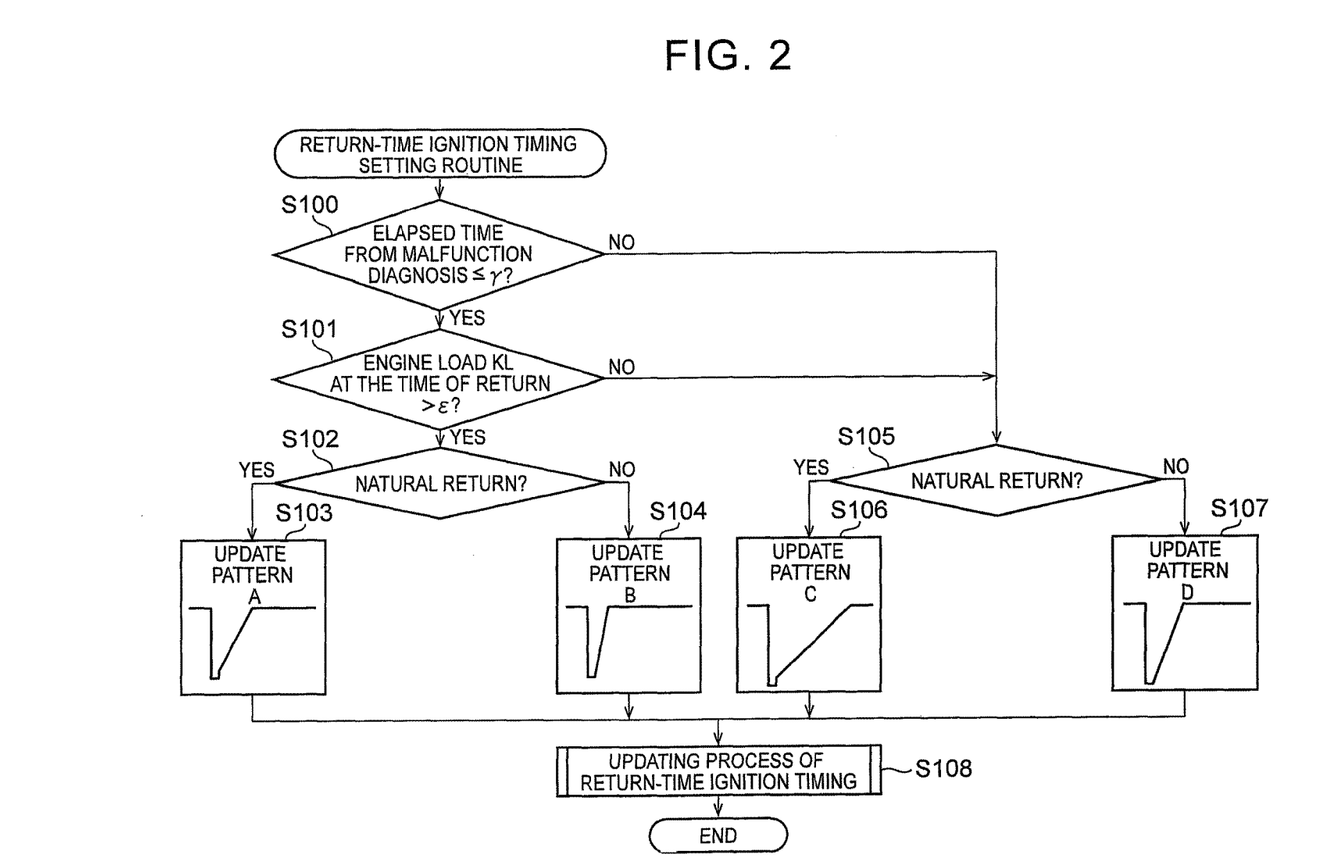
FIG. 2 is a flowchart illustrating a routine of setting an ignition retard amount at the time of return from fuel cutoff, which routine is performed by the engine control device of the embodiment of FIG. 1.

FIG. 2 is a flowchart of a return-time ignition timing setting routine illustrating a procedure of the electronic control unit 27 for setting the return-time ignition timing AFC. The electronic control unit 27 executes the routine of FIG. 2 when the engine returns from the fuel cutoff state.

Once the processing of the routine of FIG. 2 is started, it is initially determined in step S100 whether an elapsed time from the start of a malfunction diagnosis of the EGR system performed during fuel cutoff, to the present time, namely, to the time of return from fuel cutoff, is equal to or less than a predetermined criterial value γ. The criterial value γ is set to a value representing a period of time required from the time when the malfunction diagnosis is started, until the amount of new air flowing into the cylinder, which has increased due to opening and closing of the EGR valve 26 in the malfunction diagnosis, is reduced to such a level as not to affect combustion. If the elapsed time is equal to or less than the criterial value γ (YES), the control proceeds to step S101. If not (NO), the control proceeds to step S105. In this embodiment, the valve-opening time of the EGR valve 26 in the malfunction diagnosis of the EGR system is fixed; therefore, the elapsed time from completion of the malfunction diagnosis to return from fuel cutoff can be confirmed by checking the elapsed time from the start of the malfunction diagnosis to return from fuel cutoff.

If the control proceeds to step S101, it is determined in step S101 whether the engine load factor KL is equal to or larger than a predetermined criterial value ε. As the criterial value ε used in this step, an engine load factor KL is set which is obtained when the amount of air flowing into the cylinder is increased to such a level as to influence the combustion state of the engine, with respect to the case where no malfunction diagnosis of the EGR system is performed during fuel cutoff. If the engine load factor KL is equal to or larger than the criterial value ε (YES), the control proceeds to step S102. If not (NO), the control proceeds to step S105. In step S100 and step S101, it is determined whether the cylinder intake air amount has been increased due to the malfunction diagnosis of the EGR system, at the time of return from fuel cutoff.

If the control proceeds to step S102, it is determined in step S102 whether the return from fuel cutoff in this cycle is "natural return". The "natural return" means return from fuel cutoff caused by reduction of the vehicle speed SPD or reduction of the engine speed NE, namely, one of reduction of the vehicle speed SPD to be equal to or lower than the return vehicle speed α, and reduction of the engine speed NE to be equal to or lower than the return engine speed β, without depending on depression of the accelerator pedal.

On the other hand, return from fuel cutoff caused by depression of the accelerator pedal is called "forced return".

If it is determined in step S102 that the return from fuel cutoff in this cycle is "natural return" (YES), pattern A that will be described later is set as an update pattern of the return-time ignition timing AFC in step S103, and the control proceeds to step S108. If it is determined in step S102 that the return from fuel cutoff in this cycle is not the "natural return" but the "forced return" (NO), on the other hand, pattern B that will be described later is set as an update pattern of the return-time ignition timing AFC in step S104, and the control proceeds to step S108.

If the elapsed time from the start of the malfunction diagnosis to the return from fuel cutoff, exceeds the criterial value γ (S100: NO), or if the engine load factor KL is equal to or smaller than the criterial value ε (S101: NO), the control proceeds to step S105. In step S105, it is determined whether the return from fuel cutoff in this cycle is "natural return". If the return from fuel cutoff in this cycle is "natural return" (YES), pattern C that will be described later is set as an update pattern of the return-time ignition timing AFC in step S106, and the control proceeds to step S108. On the other hand, if the return from fuel cutoff in this cycle is "forced return" (NO), pattern D that will be described later is set as an update pattern of the return-time ignition timing AFC in step S107, and the control proceeds to step S108.

If the update pattern of the return-time ignition timing AFC is set, and the control proceeds to step S108, an updating process of updating the return-time ignition timing AFC according to the number of times of ignition after return from fuel cutoff is performed, according to the set decay pattern. The updating process is continued until the value of the return-time ignition timing AFC becomes equal to the value of the base ignition timing ABSE. If the updating process ends, the current cycle of the routine of FIG. 2 ends.

Figure 3:
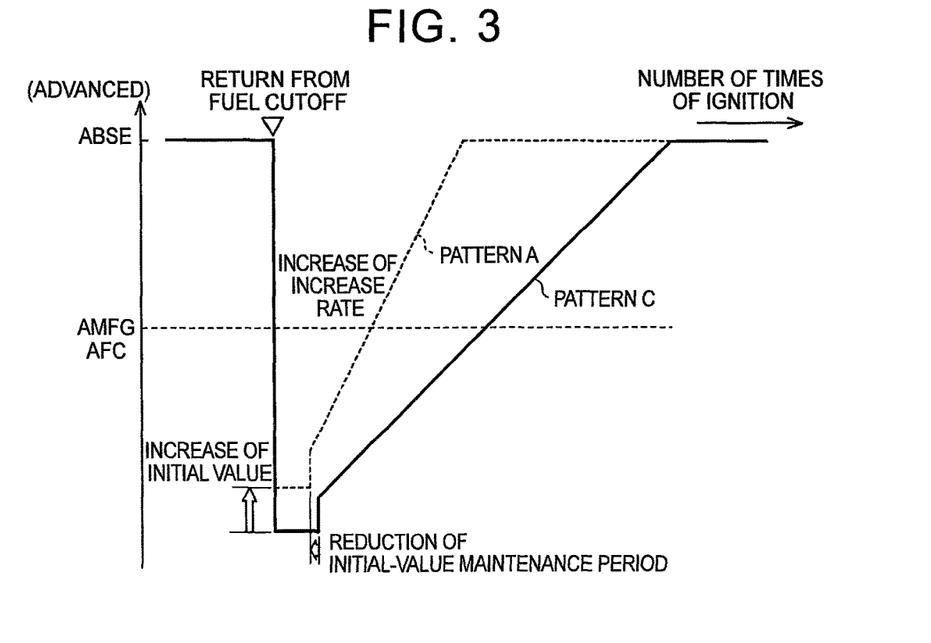
FIG. 3 is a time chart showing changes in the return-time ignition retard amount at the time of "natural return" in the engine control device of the embodiment of FIG. 1.

FIG. 3 shows transitional change of the value of the return-time ignition timing AFC when the updating process is performed according to two update patterns (pattern A and pattern C) set at the time of "natural return". In FIG. 3, the broken line indicates transitional change of the return-time ignition timing AFC when it is updated according to the pattern A, and the solid line indicates transitional change of the return-time ignition timing AFC when it is updated according to the pattern C.

In the case of "natural return", the value of the return-time ignition timing AFC is once set to a predetermined value (initial value) at the same time that the engine returns from fuel cutoff. Then, the return-time ignition timing AFC is kept at the initial value over a given number of times of ignition, and then, its value starts increasing. In the case of "natural return", the return-time ignition timing AFC is increased by a given amount at same time as the start of increase thereof, and then increased at a given rate, namely, by a given value for each ignition. In the pattern A set in the case where the cylinder intake air amount has been increased due to a malfunction diagnosis of the EGR system, the value of the return-time ignition retard amount AFCEGRED is set to a smaller value, as compared with the pattern C set in the case where the cylinder intake air amount is not increased. Accordingly, in the case of the pattern A, the initial value of the return-time ignition timing AFC is set to a value representing the more advanced timing, as compared with the case of the pattern C. Also, in the case of the pattern A, the period of maintenance of the initial value (the number of times of ignition over which the initial value is maintained) is reduced, and the rate of increase of the return-time ignition timing AFC after start of its decay is increased, as compared with the pattern C.

Figure 4:
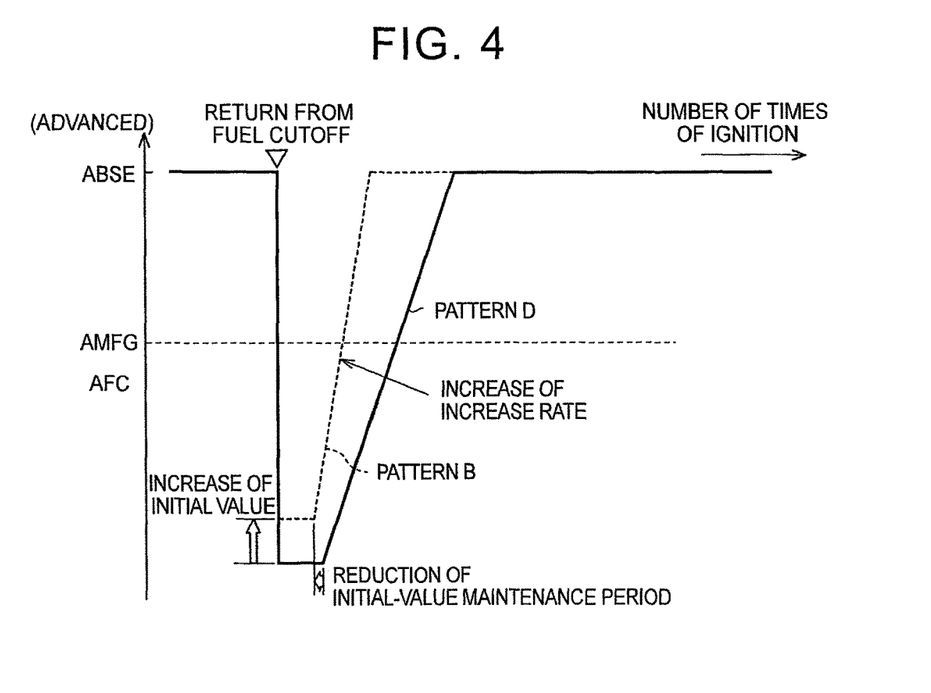
FIG. 4 is a time chart showing changes in the return-time ignition retard amount at the time of "forced return" in the engine control device of the embodiment of FIG. 1.

FIG. 4 shows transitional change of the value of the return-time ignition timing AFC when the updating process is performed according to two update patterns (pattern B and pattern D) set at the time of "forced return". In FIG. 4, the broken line indicates transitional change of the return-time ignition timing AFC when it is updated according to the pattern B, and the solid line indicates transitional change of the return-time ignition timing AFC when it is updated according to the pattern D.

I the case of "forced return", too, the value of the return-time ignition timing AFC is once set to the initial value at the same time as the return. Then, the return-time ignition timing AFC is kept at the initial value over a given number of times of ignition, and then, its value starts increasing. In the case of "forced return", the increase of the return-time ignition timing AFC is started from the initial value, and its value is increased at a given rate, namely, by a given value for each ignition. In the pattern B set in the case where the cylinder intake air amount has been increased due to a malfunction diagnosis of the EGR system, the return-time ignition retard amount AFCEGRED is set to a smaller value, as compared with the pattern D set in the case where the cylinder intake air amount is not increased. Accordingly, in the case of the pattern B, the initial value of the return-time ignition timing AFC is set to a value representing the more advanced timing, as compared with the case of the pattern D. Also, in the case of the pattern B, the number of times of ignition over which the initial value is maintained is set to a smaller value, and the rate of increase of the return-time ignition timing AFC after start of the decay is set to a higher rate, as compared with those of the pattern D.

In either case of "natural return" and "forced return", the initial value of the return-time ignition timing AFC in the case where the cylinder intake air amount has been increased due to the malfunction diagnosis of the EGR system, and the initial value of the return-time ignition timing AFC in the case where the cylinder intake air amount is not increased are set to the same values, respectively. Also, the period of maintenance of the initial value is set in the same manner. On the other hand, the rate of increase of the return-time ignition timing AFC is set to be higher in the case of "forced return", than that in the case of "natural return".

Next, the operation of the engine control device of this embodiment configured as described above will be described. In the engine control device of this embodiment, the value of the return-time ignition timing AFC is set to the initial value at the time of return from fuel cutoff. Therefore, the return-time ignition timing AFC becomes the more retarded one than the base ignition timing ABSE, and the value of the return-time ignition timing AFC is set as the final ignition timing AOP. Then, the value of the return-time ignition timing AFC is set as the final ignition timing AOP, until the return-time ignition timing AFC becomes the base ignition timing ABSE through the subsequent updating process. Namely, in this embodiment, the return-time ignition timing retard control is performed from the return from fuel cutoff, until the return-time ignition timing AFC becomes the base ignition timing ABSE. Under the return-time ignition timing retard control, the ignition timing is retarded by an amount corresponding to a difference between the base ignition timing ABSE and the return-time ignition timing AFC.

Further, in this embodiment, in either case of "natural return" and "forced return", when the elapsed period from completion of a malfunction diagnosis of the EGR system conducted during fuel cutoff, to the return from fuel cutoff, is short, the initial value of the return-time ignition timing AFC, or the ignition timing at a start point in time of the return-time ignition retard control, is set to a value representing the more advanced timing, as compared with the case where the elapsed period is long. As a result, when the elapsed period is short, the initial retard amount of the ignition timing under the return-time ignition timing retard control, namely, the retard amount of the ignition timing at the start point of the return-time ignition timing retard control relative to the ignition timing immediately before the start of the retard control, is set to a smaller value than that in the case where the elapsed period is long.

After the return-time ignition timing retard control is started, the ignition timing (the initial value of the return-time ignition timing AFC) at the start point of the control is maintained for a given period of time, and then, the ignition timing is gradually advanced until it returns to a base ignition timing. Where the elapsed period is short, the period for which the initial value of the ignition timing is maintained is shortened, and the rate of advancement of the ignition timing is increased, as compared with those in the case where the elapsed period is long.

In the case of "natural return", the ignition timing (the initial value of the return-time ignition timing AFC) at the start point of the return from fuel cutoff is maintained, until the air-fuel ratio that was reduced to be rich at the same time as the start of the return from fuel cutoff is switched to a more lean value as the base ignition timing. Then, the ignition timing is advanced by a given amount at a time at the same time as the air-fuel ratio is changed, and, after change of the air-fuel ratio, the ignition timing is gradually advanced until it returns to the base ignition timing.

Figure 5:
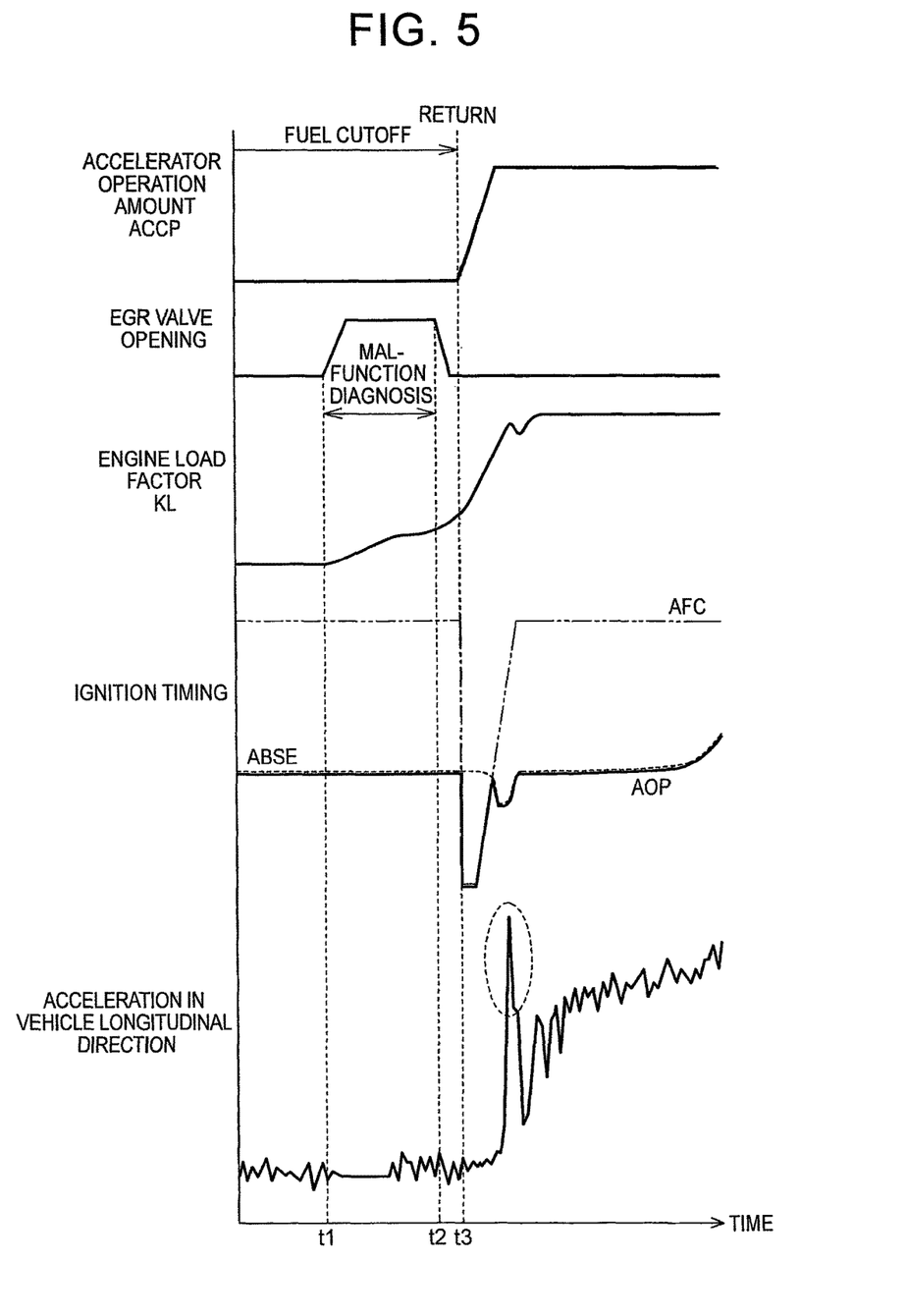
FIG. 5 is a time chart showing one example of control mode of an engine control device of a comparative example at the time of return from fuel cutoff immediately after a malfunction diagnosis.

The operation and effect as described below are provided by switching of retarding patterns of the ignition timing at the time of return from fuel cutoff as described above. FIG. 5 shows a comparative example of control mode before and after return from fuel cutoff, in the case where switching of the retarding patterns of the ignition timing at the time of return from fuel cutoff as in this embodiment is not performed. If a malfunction diagnosis of the EGR system is started at time t1 during fuel cutoff, the EGR gas is recirculated into the intake air according to the degree of opening of the EGR valve 26. Since the gas present in the exhaust passage 12 at this time is replaced with air, as a result of fuel cutoff, the amount of new air flowing into the cylinder is increased by the amount of the EGR gas thus recirculated. Accordingly, if the malfunction diagnosis of the EGR system is started, the engine load factor KL is also increased.

Then, if the malfunction diagnosis of the EGR system is completed at time t2, the EGR valve 26 is closed. If nothing happens, the engine load factor KL increased during the malfunction diagnosis would be returned to the base ignition timing after a while. However, in the example of FIG. 5, at time t3 when the engine load factor KL is still in the middle of increasing, the accelerator pedal is depressed, and the engine returns from the fuel cutoff state.

In this case, the engine returns from the fuel cutoff state in a condition where the engine load factor is higher than usual, namely, where a large amount of air flows into the cylinder. In this case, a step-like change in torque at the time of resumption of combustion becomes larger than usual. Also, since a large amount of air is present in the combustion chamber 10, and the combustion efficiency is high, the engine torque rises early after resumption of combustion, and the sensitivity of the engine torque to the retardation of the ignition timing is increased. Therefore, if the return-time ignition timing retard control is performed as usual in this case, too, the engine torque is excessively suppressed immediately after the return, and the engine torque rises abruptly when the retarded ignition timing is returned to the base ignition timing, resulting in torque shock.

When the engine returns from the fuel cutoff state in a condition where a large amount of air flows into the cylinder, the engine torque rises early, due to improvement in the combustion state, and the time of transition of transmission torque of the vehicle power train from negative to positive is advanced. Therefore, the swing-over time of release of torsional strain of the vehicle power train, which results from the above transition, is also advanced. Here, if the return-time ignition timing retard control is performed as usual, the swing-over of release of torsional strain takes place in a condition where the engine torque has not sufficiently risen, and shock, or jerking, in the vehicle longitudinal direction due to the release of torsional strain of the vehicle power train cannot be sufficiently suppressed. More specifically, a great peak as indicated by a broken-line ellipse in FIG. 5 appears in the acceleration in the vehicle longitudinal direction after the return from fuel cutoff.

Figure 6:
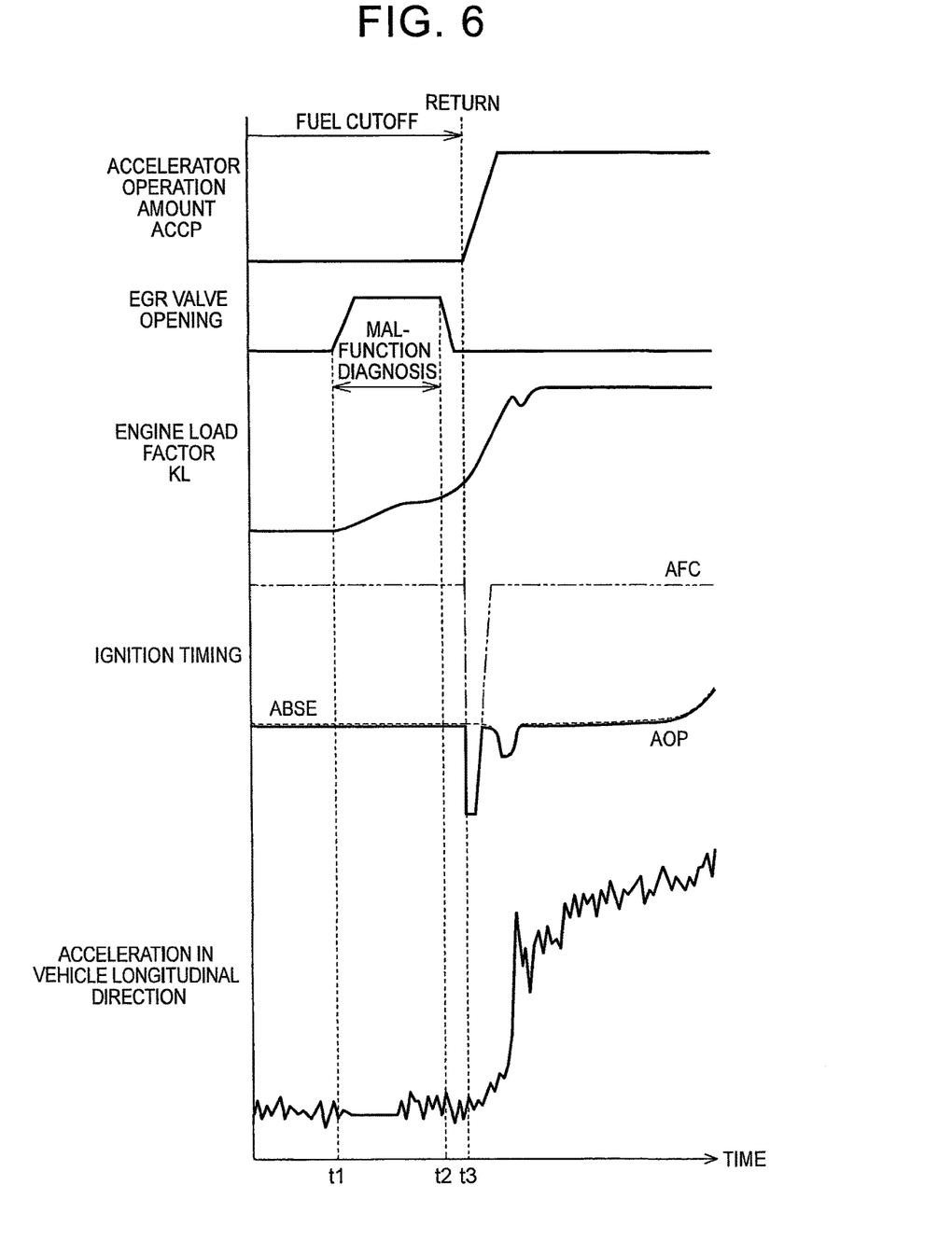
FIG. 6 is a time chart showing one example of control mode of the engine control device of the embodiment of FIG. 1 at the time of return from fuel cutoff immediately after a malfunction diagnosis.

FIG. 6 shows one example of control mode before and after return from fuel cutoff, in the engine control device of this embodiment. In the example of FIG. 6, too, a malfunction diagnosis of the EGR system is started at time t1 during fuel cutoff, and the malfunction diagnosis is completed at time t2. Then, at time t3 when the engine load factor KL is still in the middle of increasing due to the malfunction diagnosis, the accelerator pedal is depressed so that the engine returns from the fuel cutoff state.

In this embodiment, the ignition timing at the start of the return-time ignition timing retard control in this case is set to the more advanced timing than usual, and the retard amount of the ignition timing at the start of the retard control relative to the ignition timing immediately before the start of the retard control is set to a smaller value. Therefore, the engine torque immediately after the return is suitably suppressed, and the engine torque is prevented from rising abruptly when the retarded ignition timing is returned to the base ignition timing.

In this embodiment, in this case, the period for which the ignition timing at the start point of the return-time ignition timing retard control is maintained after the start of the retard control is reduced to be shorter than usual. Further in this embodiment, in this case, the rate or speed of advancement of the ignition timing when it is advanced until the ignition timing retarded at the start of the return-time ignition timing retard control returns to the base ignition timing is increased to be larger than usual. Therefore, the engine torque will be increased before the swing-over of release of torsional strain occurs, even if the timing of release of torsional strain is advanced. Accordingly, the swing-over of release of torsional strain is alleviated, and the peak of the acceleration in the vehicle longitudinal direction, which arises from the release, can be suppressed or reduced.

As described above, in this embodiment, the air-fuel ratio is temporarily shifted to the rich side at the time of return from fuel cutoff, and the air-fuel ratio of the air-fuel mixture burned in the engine is switched to a leaner value, at a point in time at which a given period elapses from the start of the return-time ignition timing retard control. With the air-fuel ratio thus switched, the engine torque is reduced by a given amount at a time. In the case of "forced return", the reduction of the engine torque due to switching of the air-fuel ratio occurs in the process of increase of the engine torque according to depression of the accelerator pedal. Therefore, only a temporary stagnation of the rise of the engine torque appears to the driver as a recognizable phenomenon. However, in the case of "natural return", the engine torque is actually temporarily reduced, which may make the driver uncomfortable.

In this respect, in the case of "natural return" in this embodiment, after the ignition timing at the start point of the return-time ignition retard control is maintained from the start thereof to switching of the air-fuel ratio, the ignition timing is advanced by a given amount at a time, and then gradually advanced until the ignition timing returns to the base ignition timing. Therefore, the reduction of the engine torque associated with switching of the air-fuel ratio can be curbed since it is counterbalanced by increase of engine torque due to the advancement of the ignition timing.

The engine control device of this embodiment as described above yields the following effects. In this embodiment, when the elapsed period from a malfunction diagnosis of the EGR system conducted during fuel cutoff to return from fuel cutoff is short, the ignition timing at the start point of the return-time ignition timing retard control is set to a value that is more advanced than that in the case where the elapsed period is long, so that the retard amount of the ignition timing at the start point of the retard control relative to the ignition timing immediately before the start of the retard control is reduced. Therefore, even if the engine returns from the fuel cutoff state in a condition where the increase of the engine load factor KL at the time of the malfunction diagnosis is still going on, the engine torque immediately after the return is suitably suppressed, and the engine torque is prevented from rising abruptly when the retarded ignition timing is returned to the base ignition timing. Accordingly, torque shock that would otherwise occur upon return from fuel cutoff can be favorably suppressed.

In this embodiment, when the elapsed period from a malfunction diagnosis of the EGR system conducted during fuel cutoff to return from fuel cutoff is short, the period of time for which the ignition timing retarded at the start of the return-time ignition timing retard control is maintained is reduced to be shorter than that in the case where the elapsed period is long. Further, in this embodiment, when the above-mentioned elapsed period is short, the rate or speed of advancement of the ignition timing when the ignition timing retarded at the start of the return-time ignition timing retard control is advanced to the base ignition timing is increased to be higher than that in the case where the elapsed period is long. It is therefore possible to favorably curb increase of torque shock due to release of torsional strain of the vehicle power train, which would occur when the engine returns from the fuel cutoff state in a condition where the increase of the engine load factor KL during the malfunction diagnosis is still going on.

In this embodiment, the pattern of retarding the ignition timing under the return-time ignition timing control is changed, based on the engine load factor KL at the time of return from fuel cutoff, as well as the elapsed period from the malfunction diagnosis of the EGR system to the return from fuel cutoff. Therefore, the pattern of retarding the ignition timing is prevented from being unnecessarily changed when the engine load factor KL is promptly reduced after the malfunction diagnosis, and the return-time ignition timing retard control can be performed more appropriately.

When torque shock at the time of return from fuel cutoff immediately after a malfunction diagnosis of the EGR system cannot be sufficiently suppressed only through the return-time ignition timing retard control, the manner of carrying out the malfunction diagnosis needs to be changed so as to suppress or reduce the torque shock. For example, occurrence of excessively large torque shock may be avoided by conducting a malfunction diagnosis only in an operating region in which torque shock at the time of return from fuel cutoff is inherently small, for example, in a middle- to high-speed region of the vehicle in which a conversion point of transmission torque of the vehicle power train from negative to positive is low, due to the use of a high speed ratio. Also, occurrence of excessively large torque may be avoided by reducing the amount of opening of the EGR valve 26 during the malfunction diagnosis, and thereby curbing increase of the amount of new air flowing into the cylinder caused by the malfunction diagnosis. However, in these cases, the frequency (or the number of chances) of malfunction diagnoses of the EGR system may be reduced, or the accuracy of the malfunction diagnosis may be reduced. In this respect, according to this embodiment, the increase of torque shock under an influence of a malfunction diagnosis is curbed by the ignition timing retard control; therefore, there is no need to change the manner of carrying out a malfunction diagnosis, in order to alleviate or reduce torque shock, thus assuring a sufficient number of chances of malfunction diagnoses and sufficiently high accuracy in the malfunction diagnosis.

In this embodiment, the air-fuel ratio control is performed so that the air-fuel ratio of the air-fuel mixture burned in the engine is switched to a leaner value, at a point in time at which a given period elapses from the start of the return-time ignition timing retard control. Then, after the ignition timing at the start point of the return-time ignition timing retard control is maintained from the start thereof to a point in time at which switching of the air-fuel ratio is effected, the ignition timing is advanced by a given amount at a time, and then gradually advanced until the ignition timing is returned to the base ignition timing. Therefore, reduction of the engine torque associated with switching of the air-fuel ratio can be curbed since it is counterbalanced by increase of engine torque due to advancement of the ignition timing.

The illustrated embodiment may be modified as follows to implement the invention. In the illustrated embodiment, a determination as to switching or selection of the pattern of retarding the ignition timing under the return-time ignition timing retard control is made based on the engine load factor KL at the time of return from fuel cutoff, as well as the elapsed period from a malfunction diagnosis of the EGR system to the return from fuel cutoff. However, the determination may be made only based on the elapsed period.

In the illustrated embodiment, under the return-time ignition timing retard control, the ignition timing is advanced by a given amount at a time at the same time as switching of the air-fuel ratio, only in the case of "natural return". However, the ignition timing may also be controlled in this manner in the case of "forced return".

When the air-fuel ratio is not switched to a leaner value at the time when a given period elapses from start of the return-time ignition timing control, or when reduction of engine torque due to switching of the air-fuel ratio is sufficiently small, the ignition timing may not be advanced by a given amount at a time at the time of switching of the air-fuel ratio.

In the illustrated embodiment, when the elapsed period from a malfunction diagnosis to return from fuel cutoff is short, the period for which the ignition timing retarded at the start of the return-time ignition timing retard control is shortened, and the rate or speed of advancement of the ignition timing when the retarded ignition timing is advanced to the base ignition timing is increased, as compared with the time when the elapsed period is long. However, if torque shock due to release of torsional strain of the vehicle power train can be sufficiently suppressed, one of the reduction of the period of maintenance of the ignition timing, and the increase of the rate of advancement, or both of them, may be omitted.

What is claimed is:

1. A control device for an engine, the engine including an exhaust gas recirculation system, the exhaust gas recirculation system including an exhaust gas recirculation valve that adjusts an amount of exhaust gas recirculated, the control device comprising
    an electronic control unit configured to:
    (i) forcedly open and close the exhaust gas recirculation valve and make a malfunction diagnosis of the exhaust gas recirculation system, during fuel cutoff of the engine;
    (ii) perform an ignition timing retard control that retards an ignition timing of the engine when the engine returns from the fuel cutoff; and
    (iii) set the ignition timing at a start point of the ignition timing retard control to a more advanced value when an elapsed period from the malfunction diagnosis of the exhaust gas recirculation system to a return from the fuel cutoff is equal to or less than a criterial value, as compared with a case where the elapsed period is longer than the criterial value, so as to reduce a retard amount of the ignition timing at the start point of the ignition timing retard control, relative to the ignition timing immediately before the start of the ignition timing retard control.

2. The control device according to claim 1, wherein the electronic control unit is configured to maintain the ignition timing at the start point of the ignition timing retard control for a predetermined period, after the start of the ignition timing retard control, and reduce the predetermined period when the elapsed period from the malfunction diagnosis of the exhaust gas recirculation system to the return from the fuel cutoff is equal to or less than the criterial value, to be shorter than the predetermined period in the case where the elapsed period is longer than the criterial value.

3. The control device according to claim 1, wherein the electronic control unit is configured to maintain the ignition timing at the start point of the ignition timing retard control for a predetermined period, after the start of the ignition timing retard control, and then advance the ignition timing until the ignition timing is returned to a base ignition timing, such that a rate at which the ignition timing is advanced is higher when the elapsed period from the malfunction diagnosis of the exhaust gas recirculation system to the return from the fuel cutoff is equal to or less than the criterial value, than the ignition timing in the case where the elapsed period is longer than the criterial value.

4. The control device according to claim 1, wherein:
    the electronic control unit is configured to perform air-fuel ratio control so as to switch an air-fuel ratio of an air-fuel mixture burned in the engine, to a leaner value, at a point in time at which a predetermined period elapses from the start of the ignition timing retard control; and
    the electronic control unit is configured to maintain the ignition timing at the start point of the ignition timing retard control, from the start of the ignition timing retard control to switching of the air-fuel ratio, then advance the ignition timing by a given amount at a time, and then gradually advance the ignition timing until the ignition timing is returned to a base ignition timing.

5. A method for controlling an engine for a vehicle that includes an electronic control unit, the engine including an exhaust gas recirculation system, the exhaust gas recirculation system including an exhaust gas recirculation valve that adjusts an amount of exhaust gas recirculated, the method comprising:
    forcedly opening and closing the exhaust gas recirculation valve and making a malfunction diagnosis of the exhaust gas recirculation system, by the electronic control unit, during fuel cutoff of the engine;
    performing, by the electronic control unit, an ignition timing retard control that retards an ignition timing of the engine when the engine returns from the fuel cutoff; and
    setting, by the electronic control unit, the ignition timing at a start point of the ignition timing retard control to a more advanced value when an elapsed period from the malfunction diagnosis of the exhaust gas recirculation system to a return from the fuel cutoff is equal to or less than a criterial value, as compared with a case where the elapsed period is longer than the criterial value, so as to reduce a retard amount of the ignition timing at the start point of the ignition timing retard control, relative to the ignition timing immediately before the start of the ignition timing retard control.

* * * * *